(12) United States Patent
Fukaya et al.

(10) Patent No.: US 7,668,337 B2
(45) Date of Patent: Feb. 23, 2010

(54) ELLIPSOID DETECTING METHOD, FIGURE CENTER DETECTING METHOD, IMAGE RECOGNIZING DEVICE, AND CONTROLLER BASED ON IMAGE

(75) Inventors: Naoki Fukaya, Obu (JP); Hironobu Fujiyoshi, Kasugai (JP); Yuusuke Sakashita, Kakamigahara (JP); Hisanori Takamaru, Nagoya (JP)

(73) Assignee: Denso Corporation, Kariya (JP)

( * ) Notice: Subject to any disclaimer, the term of this patent is extended or adjusted under 35 U.S.C. 154(b) by 735 days.

(21) Appl. No.: 11/512,482

(22) Filed: Aug. 30, 2006

(65) Prior Publication Data

US 2007/0133879 A1    Jun. 14, 2007

(30) Foreign Application Priority Data

Dec. 14, 2005 (JP) ............................. 2005-360645
Dec. 14, 2005 (JP) ............................. 2005-360646

(51) Int. Cl.
*G06K 9/00* (2006.01)
*G09B 23/02* (2006.01)

(52) U.S. Cl. ...................................... 382/100; 434/214

(58) Field of Classification Search ................. 382/100, 382/103, 117, 125, 159, 165, 170, 181, 187, 382/190, 191, 198, 281; 434/214, 237, 271; 351/206, 209, 210; 396/18, 50
See application file for complete search history.

(56) References Cited

U.S. PATENT DOCUMENTS 5,638,465 A * 6/1997 Sano et al. .................. 382/281

7,483,548 B2 * 1/2009 Nakano et al. ............... 382/103

FOREIGN PATENT DOCUMENTS

| JP | 2002-183739 | 6/2002 |
|---|---|---|
| JP | 2002-216138 | 8/2002 |
| JP | 2005-284377 | 10/2005 |

OTHER PUBLICATIONS

IEICE D-11, vol. J84-D-11 No. 2, pp. 287-298, Feb. 2001, Mori et al., "Elliptic Arc Discrimination Using Conjugate Diameter of Chord" with partial translation.

* cited by examiner

*Primary Examiner*—Abolfazl Tabatabai
(74) *Attorney, Agent, or Firm*—Harness, Dickey & Pierce, PLC

(57) ABSTRACT

A method for detecting an ellipsoid includes: extracting an ellipsoid candidate; extracting an ellipsoid contour; calculating an ellipsoid parameter; calculating an adaptability ratio; and eliminating the ellipsoid candidate. Extracting the ellipsoid candidate includes: inputting an image with figures; selecting the ellipsoid candidate from the figures; and extracting a contour candidate point and a center point. Extracting the ellipsoid contour includes: drawing straight lines; determining contour candidate points; calculating first and second distances; and defining ellipsoid contour points. Calculating the ellipsoid parameter is based on the ellipsoid contour points and the center point. Calculating the adaptability ratio includes: drawing a complete ellipsoid; and calculating the adaptability ratio between the complete ellipsoid and the ellipsoid candidate. Eliminating the ellipsoid candidate is performed when the adaptability ratio is equal to or smaller than a threshold.

14 Claims, 14 Drawing Sheets

ELLIPSOID DETECTING METHOD, FIGURE CENTER DETECTING METHOD, IMAGE RECOGNIZING DEVICE, AND CONTROLLER BASED ON IMAGE

CROSS REFERENCE TO RELATED APPLICATIONS

This application is based on Japanese Patent Applications No. 2005-360645 filed on Dec. 14, 2005, and No. 2005-360646 filed on Dec. 14, 2005, the disclosures of which are incorporated herein by reference.

FIELD OF THE INVENTION

The present invention relates to an ellipsoid detecting method, a figure center detecting method, an image recognizing device and a controller based on an image.

BACKGROUND OF THE INVENTION

In recent years, researches for presuming behavior of a driver from an image provided by photographing the face, etc. of the driver for driving a vehicle such as an automobile, etc., and for performing various controls (concretely, driving support, giving of an alarm, etc.) corresponding to a presuming result are made.

It is effective to specify driver's eyes so as to grasp the behavior of the driver. Therefore, it is important to detect an eye iris or an eye pupil of the driver from the photographed image. At present, it is tried that the ellipse is detected from an image provided by photographing the circumference of the eye and is recognized as the eye iris or the eye pupil of the driver.

In the photographed image, the eye iris and the eye pupil are not necessarily shown as a perfect ellipse, but are shown as an imperfect figure defective in one portion of a contour by partially covering the eye pupil with an eyelid as shown in FIG. 11A and projecting light on the eye pupil as shown in FIG. 11B in a certain case.

Accordingly, in the control of this kind, it is required that the figure (here, the ellipse) to be detected can be restored even when one portion of the contour is defective.

Thus, the generalized Hough transform is known as a method for restoring the figure from one portion of the contour in this way. This is disclosed in, for example, U.S. Pat. No. 5,638,465.

When the figure of a certain shape is detected by using this generalized Hough transform, a template figure of the same shape as the figure to be detected is prepared. Plural characteristic points Pi (i=1 to M, M represents a natural number) showing characters of this template figure are represented by polar coordinate vectors (Ri, αi) with respect to a reference point set in advance. A table for enumerating this polar coordinate vector (Ri, αi) is set as a template.

Ri is a distance from a reference point, and αi is an angle with respect to a reference axis passing the reference point. When the figure to be detected is an ellipse, a contour point of the ellipse may be used as a characteristic point, and an elliptical center may be used as the reference point.

Plural inspecting points Pj (j=1 to N, N represents a natural number) located on the contour of the figure are extracted from the input image. This inspecting point Pj is represented by an orthogonal coordinate system (Xj, Yj) set on the input image. Further, these orthogonal coordinates (Xj, Yj) are transformed by using Formulas F1 and F2. In these formulas, θ shows an inclination of the template figure.

$$Xj = X + R_i \times \cos(\alpha_i + \theta) \quad (F1)$$

$$Yj = Y + R_i \times \cos(\alpha_i + \theta) \quad (F2)$$

In this coordinate transformation, it is supposed that inspecting point Qj=(Xj, Yj) corresponds to characteristic point Pi=(Ri, αi) shown in the template, and the position of the reference point on the input image is calculated. Accordingly, if inspecting point Qj is fixed and the coordinate transformation is performed with respect to all the polar coordinate vectors enumerated in the table, a locus of reference point candidature is calculated. In particular, when θ is fixedly considered, the locus of this reference point candidature becomes the same shape as the template.

Namely, as shown in FIG. 12, plural loci 21 of the reference point candidature are calculated by executing similar coordinate transformation with respect to plural inspecting points Qj. A spot overlapped at one point with respect to all these plural loci 21 becomes the reference point 23 of the figure to be detected. Dotted line 20 in FIG. 12 shows an ellipse as the figure of an inspecting object, and point 22 shows inspecting point Qj.

When the position of the ellipse is detected by only the generalized Hough transform from the input image including a figure having the contour having defects as the ellipse as shown in FIGS. 11A and 11B, the position of the ellipse is presumed by using an inspecting point on the contour including these defects. Therefore, a problem exists in that detection accuracy of this position of the ellipse is greatly reduced. Here, the position of the ellipse is the position of a contour point of the ellipse determined by the ratio of major and minor axes, an inclination (i.e., an angle of the major axis) of the major axis, etc.

Therefore, the driver's eyes and behavior cannot be exactly detected from the image (i.e., the input image) including the face of the driver. Accordingly, a problem exists in that no control of driver support, etc. according to a situation of the driver can be performed.

Further, in an image in which the circumference of a driver's eye is photographed by a camera fixed into a vehicle as shown in FIGS. 11A and 11B, the size and shape of the driver's eye (iris or eye pupil) shown within this image, i.e., the size (the length of a major axis) of an ellipse to be detected, a ratio of the major and minor axes of the ellipse and an inclination (an inclination angle of the major axis) of the ellipse are variously different in accordance with a seating position of the driver and a direction of the face of the driver.

For example, in a case in which the ellipse of a template and the ellipse of an input image are the same in inclination θ but are different in size as shown in FIG. 19A, and a case in which the ellipse of the template and the ellipse of the input image are the same in size but are different in inclination θ as shown in FIG. 19B, no locus 25 is overlapped at one point and the center (reference point) of the ellipse is not detected. However, a dotted line 27 in FIGS. 19A and 19B is the ellipse as a figure of an inspecting object, and a point 26 is an inspecting point Qj.

Thus, when it is intended to detect the ellipse not constant in size and shape by the generalized Hough transform, it is necessary to prepare the template every ellipse different in the ratio of the major and minor axes. Further, when coordinate transformation is performed, it is necessary to change θ of formulas F1 and F2 in consideration of the inclination of the ellipse, and enlarge/reduce the template in size in consideration of the size (the length of the major axis) of the ellipse. Therefore, a problem exists in that a processing amount until the detection of the center of the ellipse becomes enormous.

In particular, it is required that a processor mounted to a vehicle for image processing is cheap and is excellent in noise resisting property. Therefore, no sufficiently high speed processor can be used. Therefore, when the generalized Hough transform is used in the detection of the iris or the eye pupil in the vehicle mounting controller for detecting the iris or the eye pupil of the driver and performing driver's support, etc. on the basis of its detecting result, a problem exists in that delay is caused in control and no structure resisting a practical use can be realized.

SUMMARY OF THE INVENTION

In view of the above-described problem, it is an object of the present disclosure to provide an ellipse detecting method for detecting an ellipse from an input image. It is another object of the present disclosure to provide a figure center detecting method for detecting a center of a figure in an input image. It is further another object of the present disclosure to provide an image recognizing device for detecting an ellipsoid. It is another object of the present disclosure to provide a controller for executing various kinds of controls on the basis of an ellipse in an input image.

According to a first aspect of the present disclosure, a method for detecting an ellipsoid includes steps of: extracting an ellipsoid candidate; extracting an ellipsoid contour; calculating an ellipsoid parameter; calculating an adaptability ratio; and eliminating the ellipsoid candidate. The step of extracting the ellipsoid candidate includes steps of: inputting an image having various figures; selecting the ellipsoid candidate from the various figures in such a manner that the ellipsoid candidate satisfies a predetermined condition; and extracting a contour candidate point and a center point of the ellipsoid candidate. The step of extracting the ellipsoid contour includes steps of: drawing a plurality of straight lines passing through the center point of the ellipsoid candidate; determining a pair of contour candidate points, which is a pair of cross points between each straight line and a contour of the ellipsoid candidate; calculating a first distance between one of a pair of contour candidate points and the center point; calculating a second distance between the other one of a pair of contour candidate points and the center point; and defining a pair of the contour candidate points as a pair of ellipsoid contour points when a difference between the first and second distances is disposed in a predetermined range. The step of calculating the ellipsoid parameter is performed based on a pair of ellipsoid contour points and the center point. The step of calculating the adaptability ratio includes steps of: drawing a complete ellipsoid based on the ellipsoid parameter; and calculating the adaptability ratio between a contour of the complete ellipsoid and the contour of the ellipsoid candidate. The step of eliminating the ellipsoid candidate is performed when the adaptability ratio is equal to or smaller than a predetermined threshold.

In the above method, the ellipsoid candidate, which is not suitable with the complete ellipsoid based on the ellipsoid parameter, is eliminated. Accordingly, only the ellipsoid is accurately detected from the image, so that the above method provides high accuracy of detection.

According to a second aspect of the present disclosure, an image recognizing device for detecting an ellipsoid includes: a first extracting element for extracting an ellipsoid candidate; a second extracting element for extracting an ellipsoid contour; a first calculating element for calculating an ellipsoid parameter; a second calculating element for calculating an adaptability ratio; and an eliminating element for eliminating the ellipsoid candidate. The first extracting element is capable of: inputting an image having various figures; selecting the ellipsoid candidate from the various figures in such a manner that the ellipsoid candidate satisfies a predetermined condition; and extracting a contour candidate point and a center point of the ellipsoid candidate. The second extracting element is capable of: drawing a plurality of straight lines passing through the center point of the ellipsoid candidate; determining a pair of contour candidate points, which is a pair of cross points between each straight line and a contour of the ellipsoid candidate; calculating a first distance between one of a pair of contour candidate points and the center point; calculating a second distance between the other one of a pair of contour candidate points and the center point; and defining a pair of the contour candidate points as a pair of ellipsoid contour points when a difference between the first and second distances is disposed in a predetermined range. The first calculating element calculates the ellipsoid parameter based on a pair of ellipsoid contour points and the center point. The second calculating element is capable of: drawing a complete ellipsoid based on the ellipsoid parameter; and calculating the adaptability ratio between a contour of the complete ellipsoid and the contour of the ellipsoid candidate. The eliminating element eliminates the ellipsoid candidate when the adaptability ratio is equal to or smaller than a predetermined threshold.

In the above device, the ellipsoid candidate, which is not suitable with the complete ellipsoid based on the ellipsoid parameter, is eliminated. Accordingly, only the ellipsoid is accurately detected from the image, so that the above device provides high accuracy of detection.

According to a third aspect of the present disclosure, a controller includes: the image recognizing device defined in the above second aspect; a detecting element for detecting the iris or the pupil of the eye; and an executing element for executing a process of control. The detecting element detects a movement of the ellipsoid detected by the image recognizing device as a movement of the iris or the pupil of the eye. The executing element is capable of: estimating a behavior of the human based on the movement of the iris or the pupil of the eye; and executing the process of control, which is suitable for the behavior of the human.

In the above controller, since the ellipsoid is accurately detected from the image, the human behavior is estimating from the movement of the ellipsoid more accurately. Thus, the controller has high accuracy of control.

According to a fourth aspect of the present disclosure, a method for detecting a center of a figure includes steps of: extracting a contour of the figure, which is disposed in an inputted image; determining a mass-center of a parallelogram; and determining the center of the figure. The step of determining the mass-center of the parallelogram includes steps of: drawing a plurality of parallelograms, which are different together, wherein each parallelogram is inscribed in the contour of the figure; and determining a plurality of mass-centers of parallelograms. The step of determining the center of the figure includes a step of defining the mass-center of the parallelogram as the center of the figure when the mass-center of the parallelogram has the highest occurrence rate among a plurality of mass-centers of parallelograms.

In the above method, the center of the figure is detected without converting a coordinate of the contour point of the figure. Thus, an image processing in the above method is simplified, so that a process time of the method is reduced.

According to a fifth aspect of the present disclosure, a method for detecting an ellipsoid includes steps of: extracting a contour of the figure, which is disposed in an inputted image; determining a mass-center of a parallelogram; determining the center of the figure; and calculating an ellipsoid parameter. The step of determining the mass-center of the parallelogram includes steps of: drawing a plurality of parallelograms, which are different together, wherein each parallelogram is inscribed in the contour of the figure; and determining a plurality of mass-centers of parallelograms. The step of determining the center of the figure includes a step of defining the mass-center of the parallelogram as the center of the figure when the mass-center of the parallelogram has the highest occurrence rate among a plurality of mass-centers of parallelograms. The step of calculating the ellipsoid parameter includes steps of: approximating the contour of the figure with an ellipsoid, which is obtained from four corners of each parallelogram; and calculating the ellipsoid parameter of the ellipsoid.

In the above method, the ellipsoid is detected without converting a coordinate of the contour point of the figure. Thus, an image processing in the above method is simplified, so that the process time of the method is reduced.

According to a sixth aspect of the present disclosure, an image recognizing device includes: an extracting element for extracting a contour of a figure, which is disposed in an inputted image; a first determining element for determining a mass-center of a parallelogram; and a second determining element for determining a center of the figure. The first determining element is capable of: drawing a plurality of parallelograms, which are different together, wherein each parallelogram is inscribed in the contour of the figure; and determining a plurality of mass-centers of parallelograms. The second determining element defines the mass-center of the parallelogram as the center of the figure when the mass-center of the parallelogram has the highest occurrence rate among a plurality of mass-centers of parallelograms.

In the above device, the ellipsoid is detected without converting a coordinate of the contour point of the figure. Thus, an image processing in the above device is simplified, so that the process time of the device is reduced.

According to a sixth aspect of the present disclosure, a controller includes: the image recognizing device defined in the above fifth aspect; a detecting element for detecting the iris or the pupil of the eye; and an executing element for executing a process of control. The detecting element detects a movement of the ellipsoid detected by the image recognizing device as a movement of the iris or the pupil of the eye. The executing element is capable of: estimating a behavior of the human based on the movement of the iris or the pupil of the eye; and executing the process of control, which is suitable for the behavior of the human.

In the above controller, since the ellipsoid is quickly detected from the image, the human behavior is estimating from the movement of the ellipsoid rapidly. Thus, the controller has high executing speed of control.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
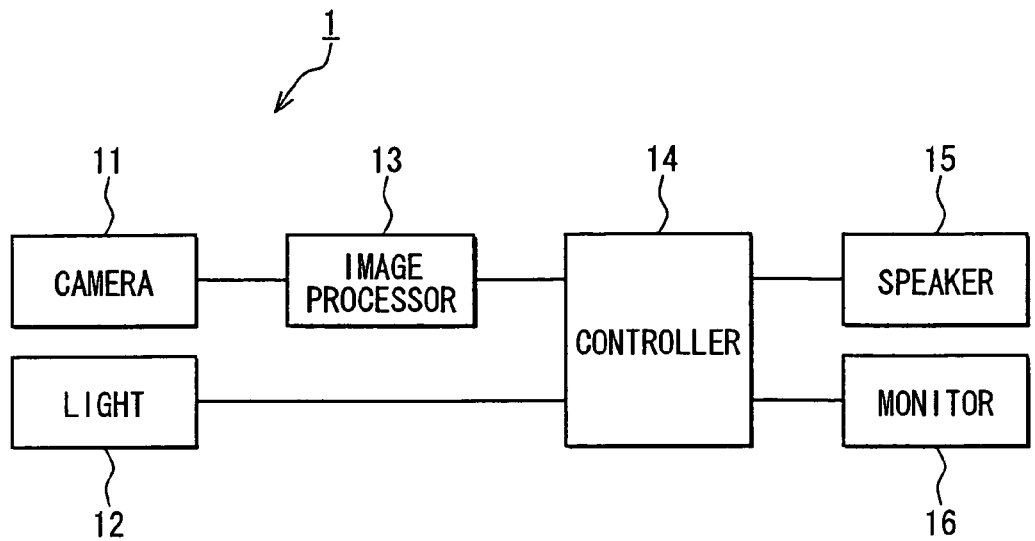
FIG. 1 is a block diagram showing a vehicle mounting controller.

FIG. 1 is a block diagram schematically showing a vehicle mounting controller 1 mounted to a vehicle such as an automobile, etc. and detecting the behavior of a driver and generating an alarm, etc. with respect to the driver.

The vehicle mounting controller 1 has at least a camera 11 for photographing an image, a light 12 for illuminating a photographed subject, an image processing section 13 as an image recognizing device for processing the photographed image, and a control section 14 for controlling the operation of each section on the basis of a program.

The light 12 is arranged in a position and a direction able to precisely irradiate the photographed subject even when the driver as the photographed subject takes a seat in any position of a driver's seat. The light 12 is constructed by a near infrared LED for emitting a near infrared ray so as to photograph an appropriate image even in the night. Plural lights 12 may be also arranged to precisely irradiate the photographed subject.

The camera 11 has a CCD element or a CMOS element able to photograph the photographed subject. The camera 11 is arranged in a position and a direction (e.g., on a dash-board) able to photograph an image including at least the face of the driver. A filter for passing only the near infrared ray is attached to the camera 11 so as to photograph only an image in which the near infrared ray irradiated by the light 12 is reflected on the driver as the photographed subject.

Figure 6A:
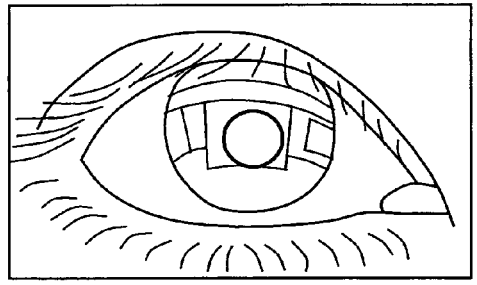
FIGS. 6A and 6B are schematic views showing the image of the eye detected by using a visible light and a near infrared light, respectively.
Figure 6B:
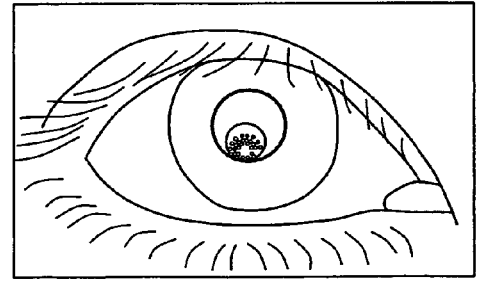
Figure 7A:
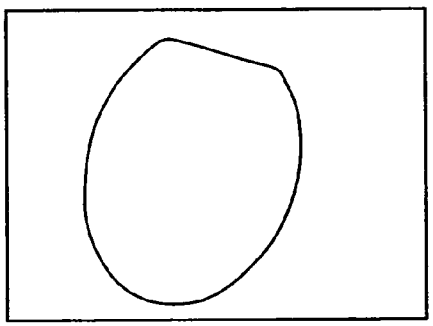
FIGS. 7A, 7C, 7E and 7G are schematic views showing an object figure having a defective contour.
Figure 7B:
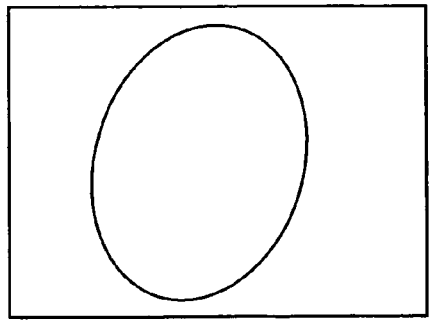
FIGS. 7B, 7D, 7F and 7H are schematic views showing a detected ellipsoid corresponding to FIGS. 7A, 7C, 7E and 7G.
Figure 7C:
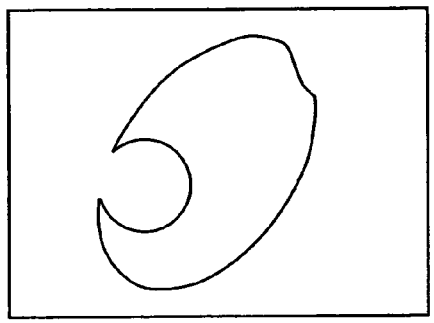
Figure 7D:
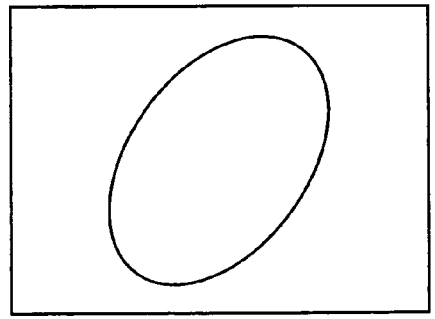
Figure 7E:
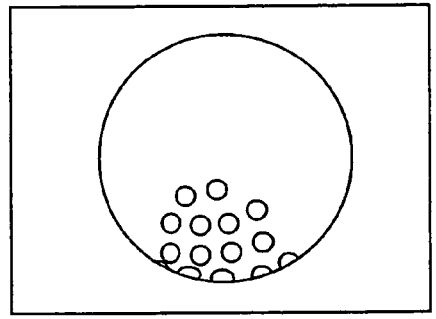
Figure 7F:
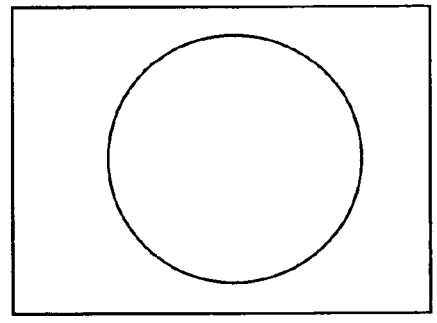
Figure 7G:
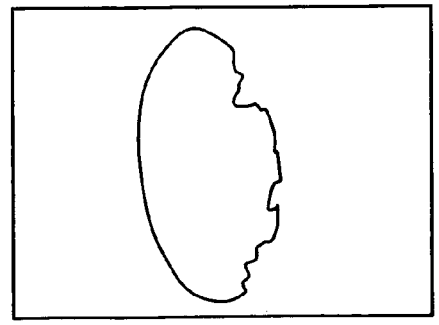
Figure 7H:
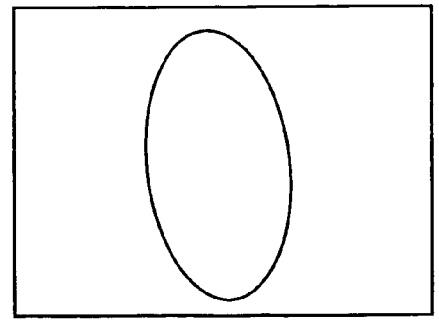

Here, FIG. 6A shows a peripheral image of a driver's eye in a visible light area. FIG. 6B shows a peripheral image of the driver's eye in a near infrared ray area. As shown in FIGS. 6A and 6B, in the image photographed in the visible light area, reflected light is incident into the eye iris and an image of eyelashes enters the interior of the image. Accordingly, the photographed image is an image which the eye pupil and other parts within the image are not easily distinguished. However, the image photographed in the near infrared area is photographed so as to make the eye pupil stand out as black. Accordingly, this image is an image easily distinguished from the other parts within this image. Namely, the camera 11 and the light 12 are set so as to obtain an image suitable for the detection of the eye pupil.

The control section 14 is centrally constructed by a publicly known microcomputer formed by at least a CPU, a ROM, a RAM and a bus for connecting these CPU, ROM and RAM.

A speaker 15 for generating an alarm sound and a monitor 16 for displaying the alarm by a character and a figure are connected to the control section 14. The speaker 15 and the monitor 16 may be used for only the vehicle mounting controller 1, and may be also mounted to the vehicle in advance and may be also attached to another vehicle mounting device.

Next, the image processing section 13 is constructed by a processor for only image processing for executing image cutting-out processing for cutting-out the circumference of an eye from the image photographed by the camera 11, ellipse candidature detection processing for detecting ellipse candidature (eye pupil of the driver) from the image cut out by the image cutting-out processing, ellipse parameter calculation processing for calculating an ellipse parameter showing the contour of the ellipse candidature detected by the ellipse candidature detection processing, etc. in accordance with commands from the control section 14.

Figure 5A:
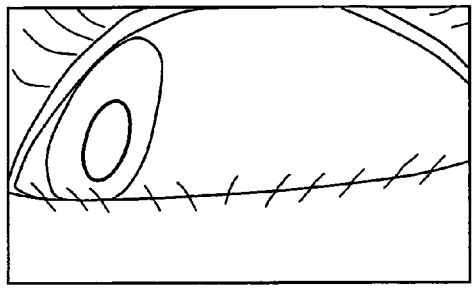
FIGS. 5A and 5B are schematic views showing an image of eye of a driver as a detecting object.
Figure 5B:
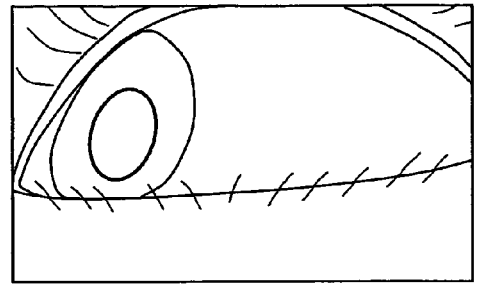

When the image including the face of the driver is photographed, the image cutting-out processing is performed in the image processing section 13, and an image around the driver's eye is cut out as shown in FIGS. 5A and 5B. Thereafter, the ellipse candidature detection processing is performed, and the eye pupil of the driver is detected as the ellipse candidature by the generalized Hough transform from the image cutout by the image cutting-out processing. In this ellipse candidature detection processing, image data having information relating to at least the coordinate of a central point and the coordinate of a contour point in a figure of the ellipse candidature are generated. These processings are publicly known techniques.

Figure 2:
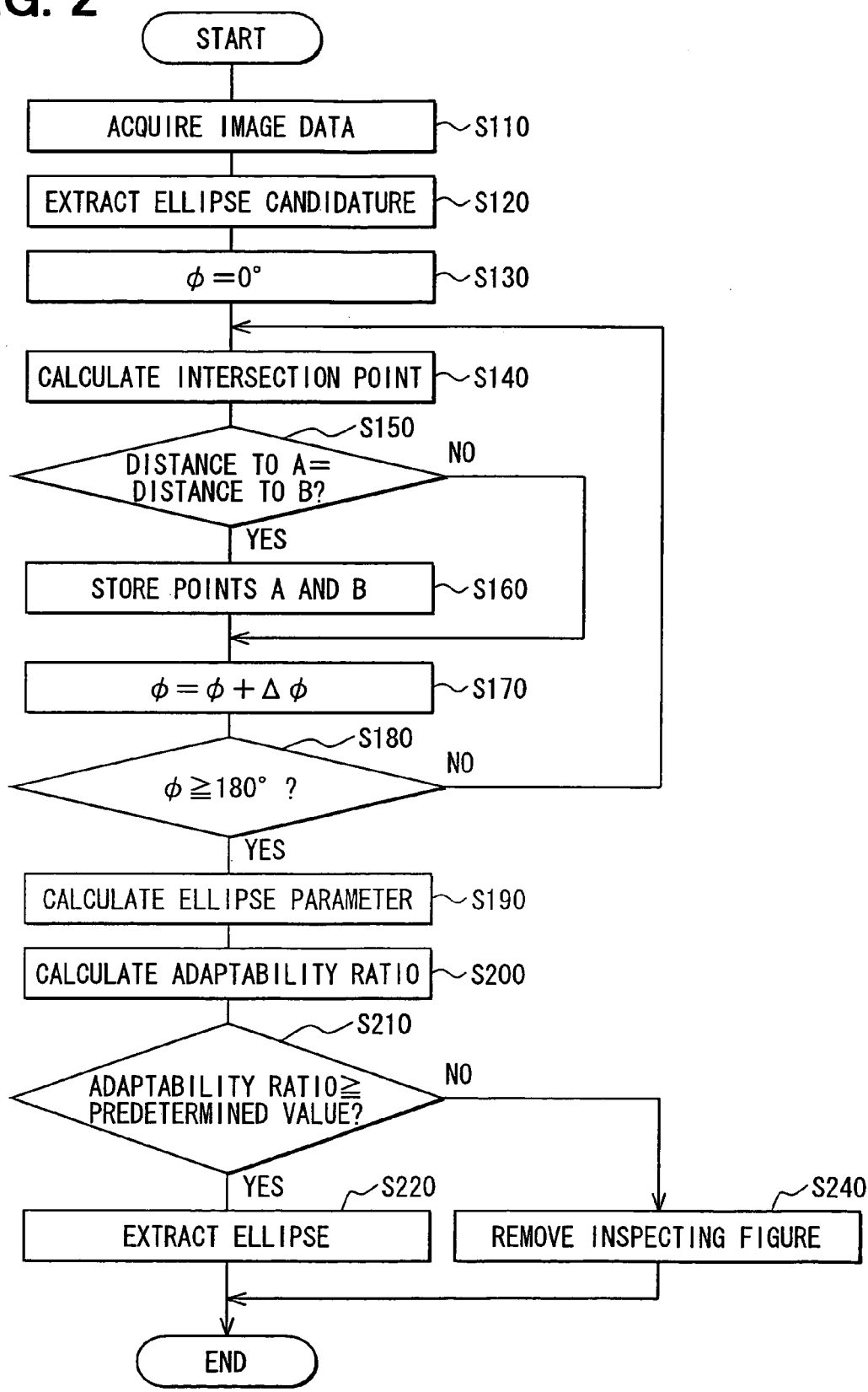
FIG. 2 is a flow chart showing an ellipsoid detecting process.

The ellipse parameter calculation processing will next be explained by using the flow chart shown in FIG. 2.

When this processing is first executed, image data generated in the ellipse candidature detection processing are acquired in S110.

Figure 3A:
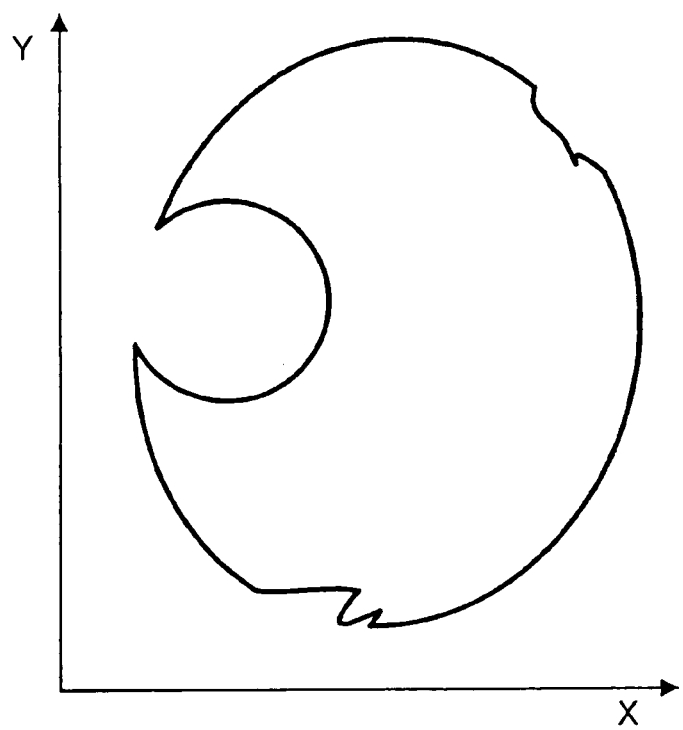
FIGS. 3A and 3B are graphs showing an extracting method of an ellipsoid contour point.

In subsequent S120, the coordinate of a central point and the coordinate of a contour point in a candidature figure as a figure (i.e., the eye pupil) of the ellipse candidature are read from the image data acquired in S110. There is a case in which a candidature figure including a defect in the contour as shown in FIG. 3A is extracted as the ellipse candidature. In the following description, the explanation will be made by supposing that such a candidature figure is extracted. The candidature figure shown in FIGS. 3A and 3B is shown by an orthogonal coordinate system in which the axis of abscissa is set to X and the axis of ordinate is set to Y.

In S130, setting angle $\phi$ is set to 0° as an initial value. As shown in FIG. 3B, setting angle $\phi$ is an angle formed by a reference straight line (straight line IIIC shown in FIG. 3B) passing the central point and parallel to the Y-axis, and a straight line (straight line IIIE shown in FIG. 3B) passing the central point IIIF.

Figure 3B:
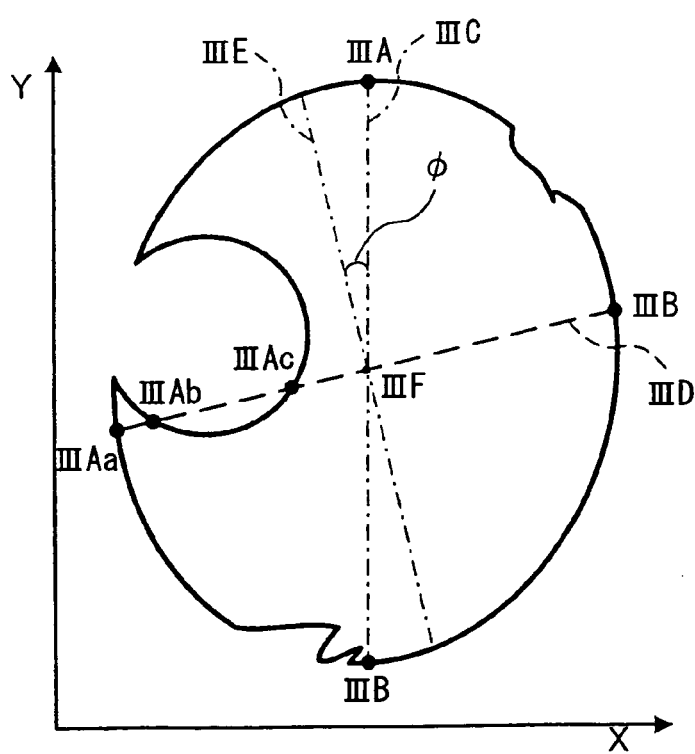

In subsequent S140, intersection points of the straight line (straight line IIIC in FIG. 3B) having setting angle $\phi$ and passing the central point IIIF of the candidature figure as shown in FIG. 3B, and the contour point of the candidature figure are set as points IIIA and IIIB. The distance (hereinafter called a first distance) between point IIIA and the central point IIIF of the candidature figure, and the distance (hereinafter called a second distance) between point IIIB and the central point IIIF of the candidature figure are then calculated. The first distance and the second distance are shown with the size of a pixel as a unit.

When the intersection point of the straight line passing the center IIIF of the candidature figure at setting angle $\phi$ and the contour point of the candidature figure becomes plural points of three places or more, the distances between the respective intersection points and the central point of the candidature figure are calculated. Namely, when the straight line passing the center of the candidature figure at setting angle $\phi$ is IIID shown in FIG. 3B, the respective intersection points are set as IIIAa, IIIAb, IIIAc and IIIB. The distance between IIIAa and the central point IIIF, the distance between IIIAb and the central point IIIF, the distance between IIIAc and the central point IIIF, and the distance between IIIB and the central point IIIF are then calculated.

In S150, it is judged whether the first distance and the second distance are equal or not. Concretely, it is judged whether the difference between the first distance and the second distance lies within an error range set in advance or not. When the first distance and the second distance are not equal as a result of the judgment, it proceeds to S170.

In contrast to this, when the first distance and the second distance are equal as the judging result of S150, it proceeds to S160. Points IIIA and IIIB used in calculating these first distance and second distance are then stored to the RAM of the control section 14 as contour forming points of the ellipse.

However, when the number of intersection points of the straight line and the contour point is a plural number such as three or more as mentioned above and the distances between the respective intersection points and the central point of the candidature figure are calculated, the contour forming point is set in accordance with the following condition.

First, when no other intersection points exist between the central point and a farthest intersection point on the straight line of one side extending from the central point of the candidature figure, the distance between this farthest intersection point and the central point, and the distances between the other intersection points and the central point are compared. The intersection point judged as an equal distance is set to the contour forming point. Namely, when the intersection point is set as in straight line IIID shown in FIG. 3B, only IIIAa having an equal distance between point IIIB and the central point IIIF of the candidature figure among IIIAa, IIIAb and IIIAc is set to the contour forming point and is stored to the RAM of the control section 14. Further, when plural sets of intersection points having the difference between the first distance and the second distance within the error range exist with respect to a single straight line, only a set having a smallest difference is stored as the contour forming point.

In subsequent S170, an increasing amount $\Delta\phi$ of the setting angle set in advance is added to setting angle $\phi$ and setting angle $\phi$ is reset.

In subsequent S180, it is judged whether or not setting angle $\phi$ is 180° or more. When setting angle $\phi$ is less than 180° as a result of the judgment, it is returned to S140 and the processings of S140 to S170 are repeated.

In contrast to this, when setting angle φ is 180° or more as the result of the judgment in S180, it proceeds to S190.

Figure 4:
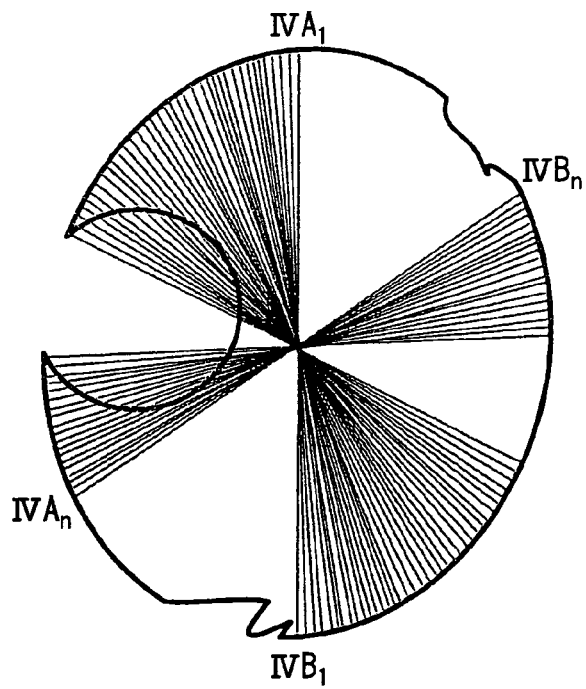
FIG. 4 is a graph showing the extracting method of an ellipsoid.

In S190, the elliptical equation shown in the following formula F3 is solved by the Gauss Newton method using the positions of the contour forming points (intersection points IVA1 to IVAn, and IVB1 to IVBn between plural straight lines shown in FIG. 4 and the contour of the candidature figure) stored in S160 as shown in FIG. 4, and ellipse parameters A to F in formula F3 are then calculated. Here, n in IVAn and IVBn is the number of contour forming points.

$$Ax^2+Bxy+Cy^2+Dx+Ey+F=0 \qquad F3$$

In subsequent S200, the ellipse is restored from the ellipse parameters and the elliptical equation calculated in S190. An adaptability ratio showing a conformity degree of the contour of the candidature figure and the restored ellipse is then calculated. Here, the ratio of pixels overlapped with pixels of the contour of the candidature figure among all pixels constituting the restored ellipse is calculated as the adaptability ratio.

In S210, it is judged whether the adaptability ratio calculated in S200 exceeds a threshold value (here, the adaptability ratio is set to 70%) set in advance or not. When no adaptability ratio exceeds the threshold value as a result of the judgment, it proceeds to S240. After the ellipse candidature (calculated ellipse parameter) set to an inspecting object is then deleted, the ellipse detection processing is terminated.

In contrast to this, when the adaptability ratio exceeds the threshold value as the result of the judgment in S210, it proceeds to S220. It is then extracted that the ellipse candidature set to an inspecting object is the ellipse and the calculated ellipse parameter approximates the figure of the ellipse candidature. Thereafter, this processing is terminated.

Next, the control section 14 acquires information of the position, etc. of the ellipse (i.e., the eye iris or the eye pupil of a driver) detected by the ellipse detection processing from the image processing section 13. The control section 14 then judges a state of the driver such as driver's eyes and a doze, etc. on the basis of an ellipse detecting result and other image processing results. When the control section 14 judges that it is not a state suitable for driving such as dozing of the driver, etc., the speaker 15 generates a sound and gives an alarm to the driver and an alarm such as a character, a figure, etc. is displayed in the monitor 16.

As explained above, in accordance with the vehicle mounting controller 1, the ellipse parameter is calculated by using only a point recognized as the contour forming point among the contour points of the candidature figure, and the ellipse is restored. Therefore, even when one portion of the candidature figure to be detected as the ellipse is defective, the contour point (outlier) of this defective portion is not used in the calculation of the ellipse parameter. Accordingly, the ellipse parameter showing the contour of the candidature figure can be exactly and rapidly calculated.

Further, in accordance with the vehicle mounting controller 1, when the adaptability degree of the ellipse restored from an object figure and the object figure is low, this object figure is set to be removed as a figure except for the ellipse. Accordingly, no figure of point symmetry except for the ellipse is detected in error, and only the ellipse can be reliably detected.

Therefore, in accordance with the vehicle mounting controller 1, a movement of the detected ellipse (i.e., the eye pupil of a driver), the driver's eyes and behavior of the driver can be exactly presumed. As this result, an alarm sound is generated and the alarm can be displayed by a character and a figure on the basis of a reliable state of the driver. Therefore, it is possible to urge the driver to a safe drive.

Detecting results of FIGS. 7B, 7D, 7F and 7H are obtained as a result of an experiment made by using images shown in FIGS. 7A, 7C, 7E and 7G. Namely, it is understood from these results that the ellipse removing the contour (outlier) constituting a defective portion is restored from the contour point of the candidature figure having a defect as the contour of the ellipse.

S120 of the ellipse candidature detection processing and the ellipse parameter calculation processing corresponds to an ellipse candidature extracting process (ellipse candidature extracting means). S130 to S180 of the ellipse parameter calculation processing correspond to an ellipse contour extracting process (ellipse contour extracting means). S190 of the ellipse parameter calculation processing corresponds to an ellipse parameter calculating process (ellipse parameter calculating means). S210 and S240 of the ellipse parameter calculation processing correspond to a candidature figure removing process (candidature figure removing means).

In this embodiment mode, the ellipse within an image is detected as the eye pupil of a driver, and the driver's eyes, etc. are presumed from its detecting result. However, the ellipse within the image may be also detected as each of head portions of the driver and a person riding in the same vehicle, and opening-closing timing or speed of an air bag may be also controlled. Further, when the head portions of the driver and the person riding in the same vehicle are detected as the ellipse and the driver and this person are riding in the vehicle, control may be also performed so as to urge the driver and the person to wearing of a seat belt, etc.

Further, a state of the driver such as the driver's eyes and a doze, etc. is judged from the ellipse detected by the ellipse detection processing, and control in which the speaker 15 generates a sound and an alarm is given to the driver, etc. is performed in accordance with the state of the driver. However, control in which the vehicle is stopped and decelerated by operating a brake and the aperture of an accelerator is relaxed, etc. may be also performed in accordance with the state of the driver.

Further, in the ellipse candidature detection processing, the ellipse candidature may be also detected by a method except for the generalized Hough transform. Namely, any method may be used if image data including a figure of the ellipse candidature having at least the coordinate of a central point and the coordinate of a contour point in the figure of the ellipse candidature are generated.

Further, a numerical value analyzing method for calculating the ellipse parameter is not limited to the Gauss Newton method, but may be any method if a calculation can be made in a small error as in the steepest decent method.

Further, a place on the dash-board is enumerated as one example of an arranging place of the camera 11, but the camera 11 may be also arranged in the interior of a meter, on a handle column, near a room mirror, etc. arranged in the vehicle. Namely, the camera 11 may be arranged in any position if the camera 11 is arranged in a position and a direction able to photograph an image including at least the face of the driver.

Further, the threshold value with respect to the adaptability ratio is set to 70%, but may be also changed in accordance with an object for detecting the ellipse.

Further, the input image is not limited to an image photographed in the near infrared area. Namely, the input image may be photographed in a general visible light area and may be also photographed in an infrared ray area.

Further, the eye pupil of the driver is detected as the vehicle mounting controller, but no detected ellipse is limited to the eye pupil of the driver. Namely, only the ellipse may be also extracted from the image of a candidature figure 50 having a defect at the contour point as shown in FIG. 8.

Figure 8:
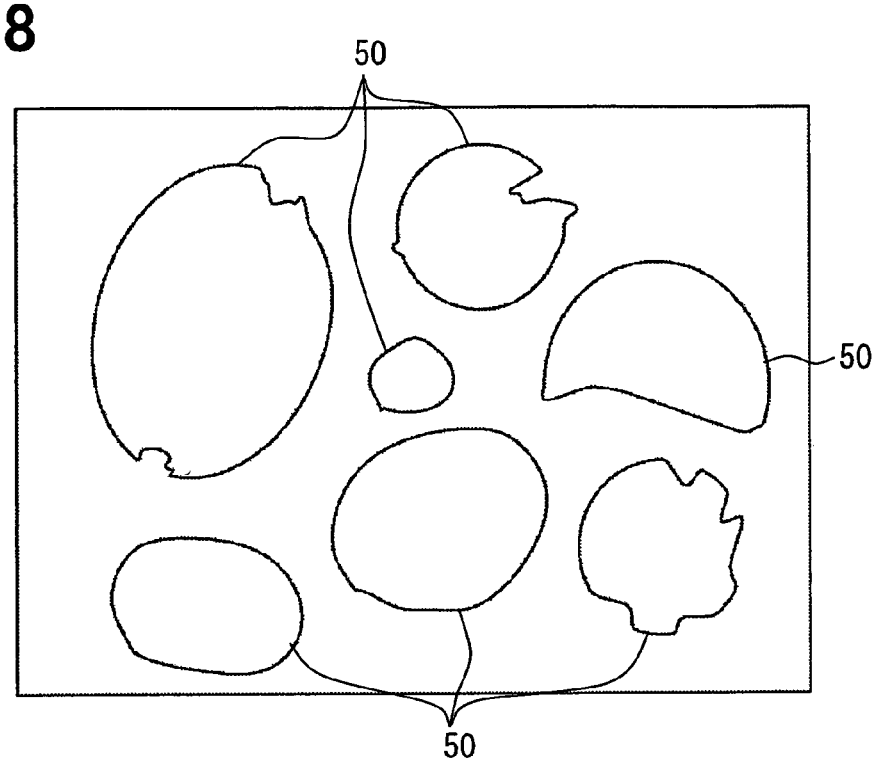
FIG. 8 is a schematic view showing various object figures.
Figure 9:
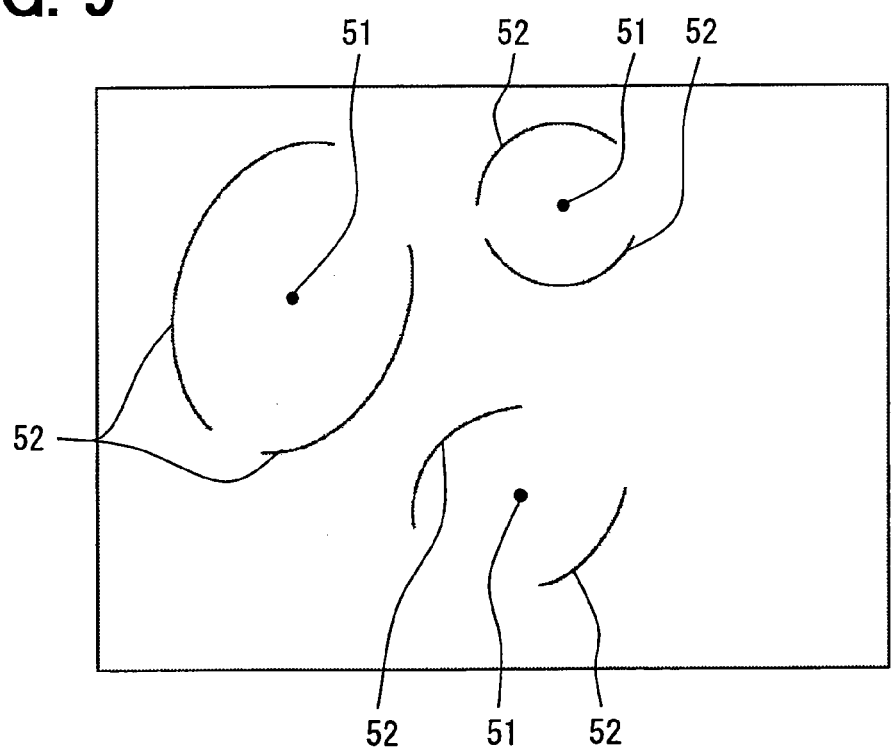
FIG. 9 is a schematic view showing candidature ellipsoid corresponding to FIG. 8.
Figure 10:
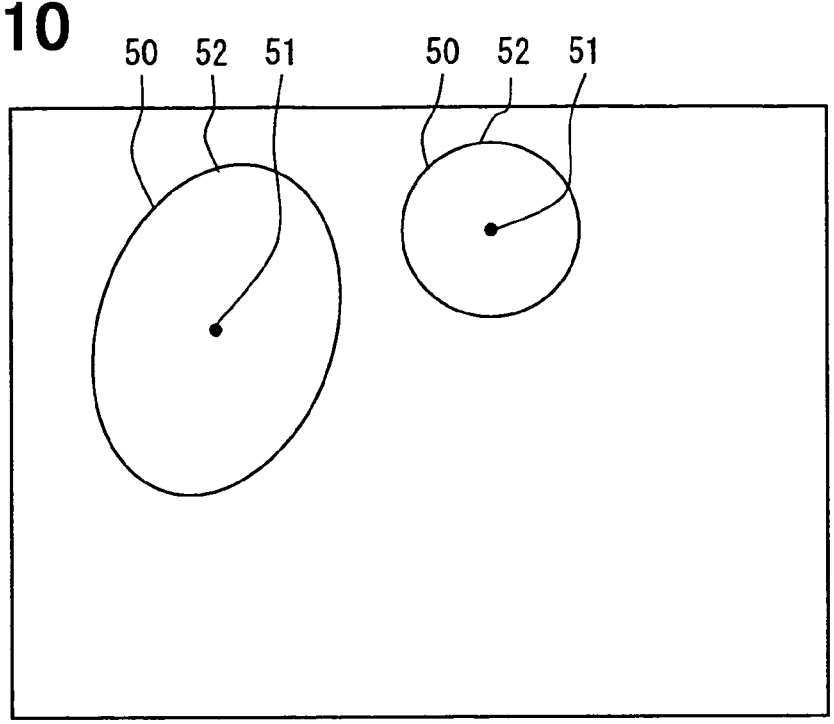
FIG. 10 is a schematic view showing detected ellipsoid corresponding to FIG. 9.
Figure 11A:
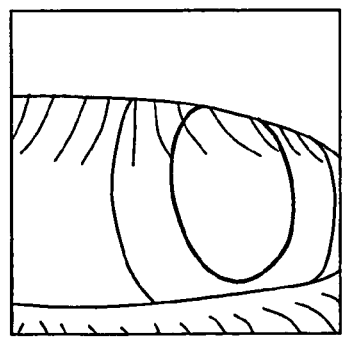
FIGS. 11A and 11B are schematic views showing an image of an eye pupil having a defective contour according to a related art.
Figure 11B:
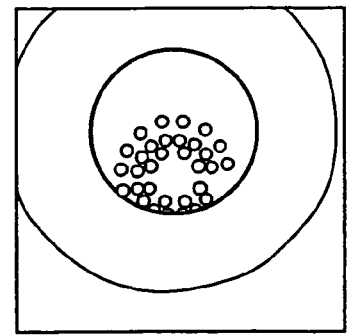
Figure 12:
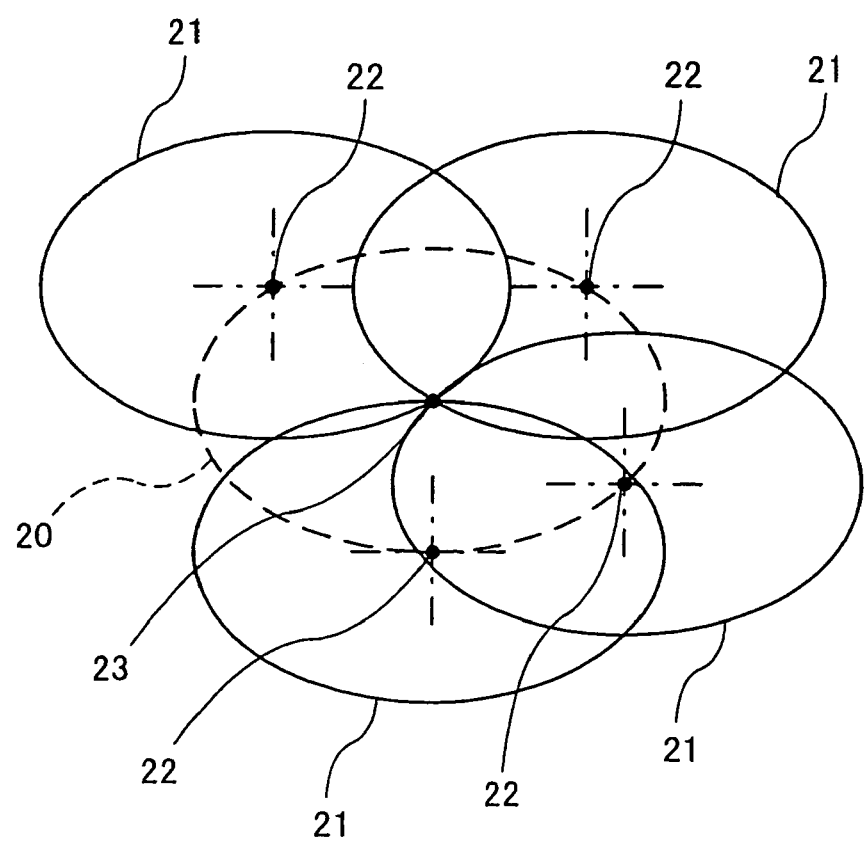
FIG. 12 is a graph explaining a general Hough transform method according to the related art.

When the device is applied to the image as shown in FIGS. 8 and 9, the center 51 of a figure and a contour candidature point 52 of the ellipse being no defective portion are extracted as shown in FIG. 9. The ellipse having a large defect of the contour is removed. Further, when the adaptability ratio of the contour candidature point 52 of the ellipse and the contour of the candidature figure 50 is a certain threshold value or less, its object figure is removed. Therefore, only the ellipse can be detected as shown in FIG. 10.

For example, the ellipsoid detecting method can be applied to an inspecting device, etc. for inspecting whether a product having to have an elliptical shape is an inferior product or not from such an application example.

Figure 13:
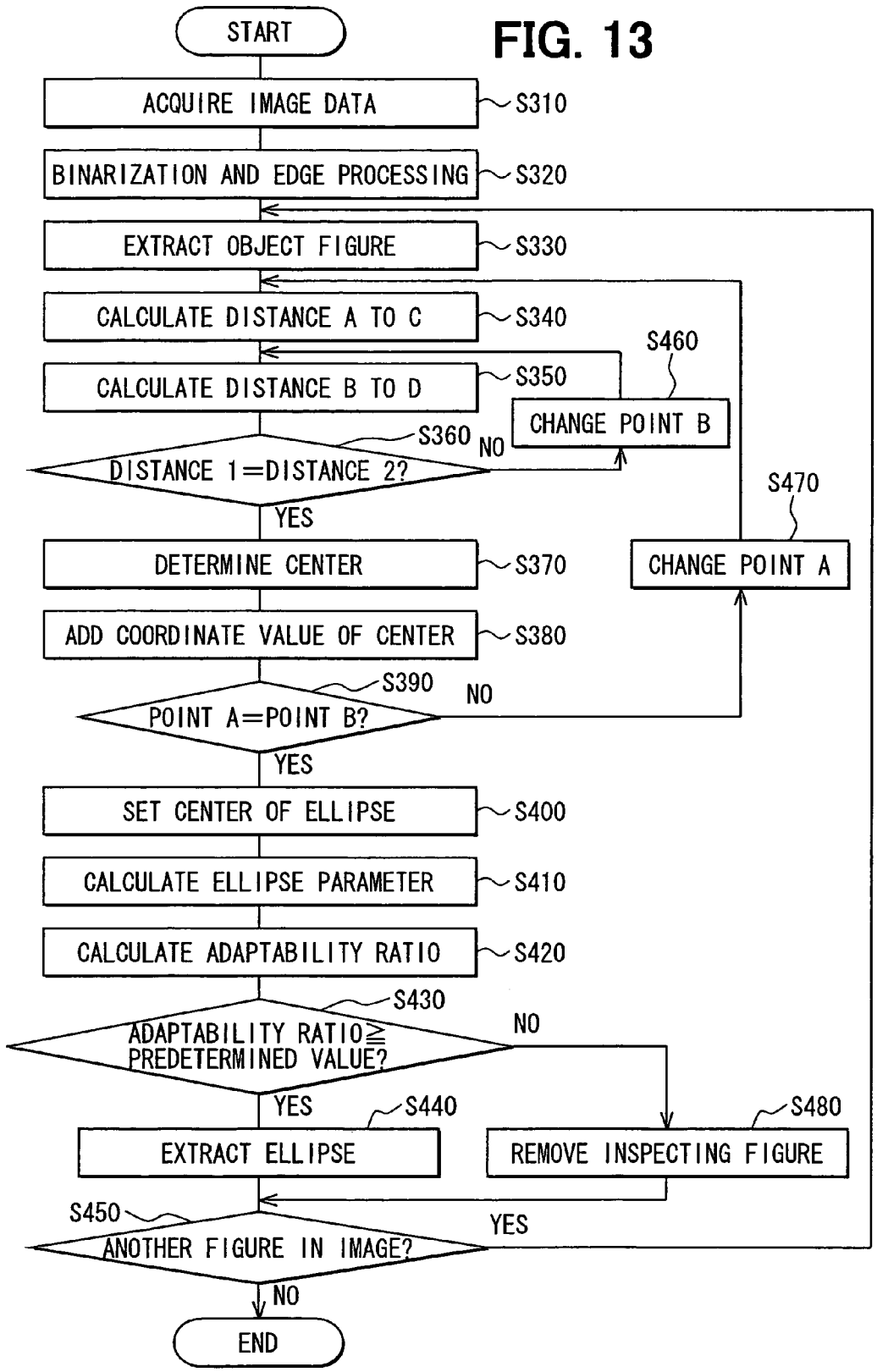
FIG. 13 is a flow chart showing another ellipsoid detecting process.

Ellipse detection processing according to a second example embodiment will next be explained by using the flow chart shown in FIG. 13.

A map (hereinafter called a central point candidature map) having each element set to correspond to each pixel position of image data is set to be prepared in a RAM of a control section 14.

First, when this processing is executed, an image (an image cut out by image cutting-out processing) in the circumference of a driver's eye is acquired as the image data in S310.

In subsequent S320, the image data acquired in S310 are binarized and edge processing for clarifying the contour of a figure within the image data is performed. Namely, the shape of the figure within the image data is clarified by the binarization processing and it is possible to obtain an image in which the eye pupil of the driver as a detecting object as shown in FIGS. 15C and 15D is greatly different from other parts within the image.

Further, processing for emphasizing a pixel (hereinafter, the pixel located in the contour is set to a contour pixel) located in the contour of the figure within the image data is performed in the edge processing. Namely, it is possible to obtain an image in which the contour of the eye pupil of the driver as shown in FIGS. 15E and 15F is shown by the edge processing.

Figure 14A:
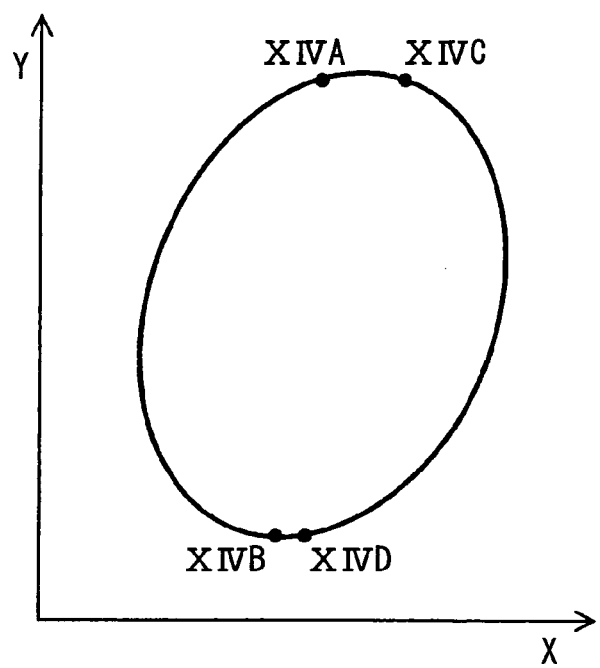
FIGS. 14A and 14B are graphs showing another extracting method of an ellipsoid center.

In subsequent S330, one figure (hereinafter set to an object figure) as an inspecting object is extracted from the image data. As shown in FIG. 14A, with respect to pixels, i.e., contour pixel, showing a contour point of the object figure (here set to an ellipse), the contour pixel having a coordinate Y smaller by one pixel or a few pixels than the pixel of a largest coordinate Y within this figure is then set as an initial value of point XIVA used in an inquiry of a central point described later. The contour pixel having a smallest coordinate Y within FIG. 14A is similarly set as an initial value of point XIVB used in the inquiry of the central point.

In S340, an intersection point (hereinafter set to point XIVC) of a first horizontal line horizontally extending from point XIVA and the contour pixel of the object figure is then detected, and a first distance between points XIVA and XIVC is calculated.

Similarly, in S350, an intersection point (hereinafter set to point XIVD) of a second horizontal line horizontally extending from point XIVB and the contour pixel of the object figure is detected and a second distance between points XIVB and XIVD is calculated.

In subsequent S360, it is judged whether the first distance and the second distance calculated in S340 and S350 are conformed or not.

Figure 14B:
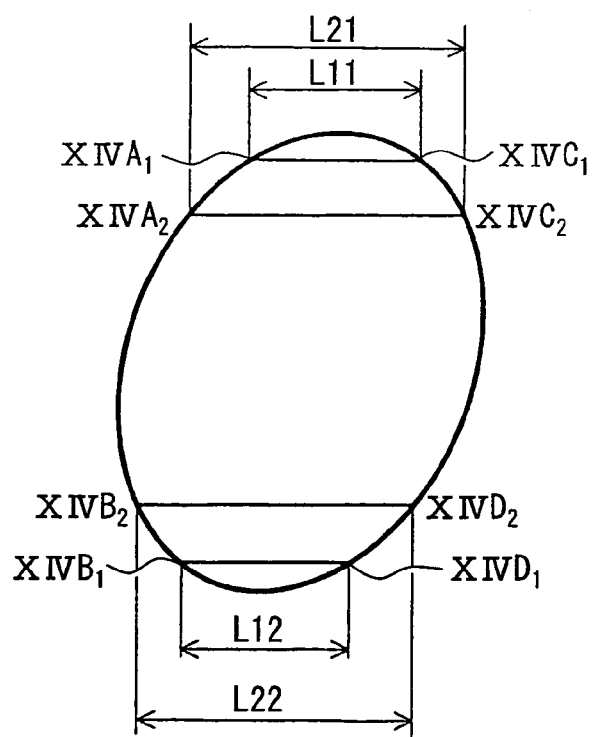

Namely, as shown in FIG. 14B, it is judged whether the first distance L11 between points XIVA1 and XIVC1 and the second distance L12 between points XIVB1 and XIVD1 are conformed or not. Points XIVA1, XIVB1, XIVC1 and XIVD1 in FIG. 14B are points XIVA, XIVB, XIVC and XIVD in a certain inspecting position.

When the first distance and the second distance are not conformed as a result of this judgment, it proceeds to S460. The pixel of a contour point at which point XIVB is moved by one pixel or a few pixels in a direction for increasing the coordinate Y, is then reset as a new point XIVB. It is then returned to S350. Namely, point XIVB is moved such that the second distance becomes long and approaches the first distance.

In contrast to this, when the first distance and the second distance are conformed as the result of the judgment in S360, it proceeds to S370. Points XIVA to XIVD are then set as points for forming respective vertexes of a parallelogram inscribed in the object figure, and the position of a gravity center of this parallelogram is calculated. This position of the gravity center is then stored to the RAM of the control section 14 correspondingly to the positions of points XIVA to XIVD.

The position of the gravity center of the parallelogram is calculated by calculating the pixel of a position as an intersection point of diagonal lines of the parallelogram on the basis of the positions of pixels of points XIVA, XIVB, XIVC and XIVD.

In subsequent S380, the count of a position (element) corresponding to the position of the gravity center of the parallelogram detected in S370 within the central point candidature map is increased.

In S390, it is then judged whether points XIVA and XIVB are conformed or not. When no points XIVA and XIVB are conformed, it proceeds to S470. The contour pixel moved downward by one pixel or a few pixels from the present point XIVA in a direction for reducing the coordinate Y is reset as a new point XIVA, and it is returned to S340. Namely, point XIVA is moved so as to lengthen the first distance, and the above processings of S340 to S380 are repeated.

Thus, for example, points XIVA1, XIVC1, XIVD1 and XIVB1 shown in FIG. 14B are moved to points XIVA2, XIVC2, XIVD2 and XIVB2. When the distance L21 between points XIVA2 and XIVC2 and the distance L22 between points XIVD2 and XIVB2 are conformed, the gravity center of a new parallelogram having points XIVA2, XIVC2, XIVD2 and XIVB2 as vertexes is detected, and the count on the central point candidature map is added.

In contrast to this, when points XIVA and XIVB are conformed as a result of the judgment in S390, it proceeds to S400. A position corresponding to an element of a large count on the central point candidature map is then extracted as a central point of the object figure. However, when the count of all positions in the central point candidature map is lower than a prescribed value set in advance, the central position of this object figure is set to be unable to be detected and this object figure is removed.

In subsequent S410, with respect to points XIVA to XIVD stored to the RAM in S360, a point at which the position of the center of the object figure extracted in S400 is correspondingly set as the position of the gravity center, is read out as a contour point of the object figure.

The elliptical equation shown in formula F3 is then solved by the Gauss Newton method using the positions of these read-out plural contour points, and ellipse parameters A to F are calculated. In this case, with respect to the contour point said here, points XIVA to XIVD are treated as one set, and the elliptical equation shown in formula F3 is solved by using five sets of contour points at its minimum.

In subsequent S420, the ellipse is restored from the ellipse parameters and the elliptical equation calculated in S410, and an adaptability ratio showing a conformity degree of the contour of the object figure and the restored ellipse is calculated. Here, the ratio of pixels overlapped with pixels of the contour of the object figure among all pixels constituting the restored ellipse is calculated as the adaptability ratio.

In S430, it is then judged whether the adaptability ratio calculated in S420 exceeds a threshold value (adaptability ratio is here set to 70%) set in advance or not. If no adaptability ratio exceeds the threshold value as a result of the judgment, it proceeds to S480.

In this S480, no shape of the object figure selected in S330 is set to the ellipse, and this object figure is deleted from the image data, and it proceeds to S450.

In contrast to this, when the adaptability ratio exceeds the threshold value as the result of the judgment in S430, it proceeds to S440, and the object figure selected in S330 is extracted as the ellipse (i.e., the eye pupil of a driver).

In subsequent S450, it is then judged whether a figure to be set to the object figure is left within the image data or not. When such a figure exists as a result of the judgment, it is returned to S330. In contrast to this, when such a figure does not exist, the ellipse detection processing is terminated.

Next, the control section 14 acquires information of the position of the ellipse (i.e., the eye pupil of the driver) detected by the ellipse detection processing by the image processing section 13. The control section 14 then judges a state of the driver such as the driver's eyes, a doze, etc. on the basis of an ellipse detecting result and other image processing results. When the control section 14 judges that it is not a state suitable for driving as in dozing of the driver, etc., the speaker 15 generates a sound and gives an alarm to the driver, and an alarm of a character, a figure, etc. is displayed in the monitor 16.

As explained above, in accordance with the vehicle mounting controller 1, the ellipse is detected from the input image without performing coordinate transformation as in the generalized Hough transform. Therefore, a processing amount from the input of the image to the detection of the ellipse can be reduced. As a result, processing time can be shortened.

As its result, in the vehicle mounting controller 1, the alarm sound can be generated and the alarm can be displayed by a character and a figure without a large time lag from photographing of the image. Therefore, it is possible to urge the driver to a safe drive.

Further, in accordance with the vehicle mounting controller 1, when the adaptability degree of the ellipse restored from the object figure and the object figure is low, this object figure is set to be removed as a figure except for the ellipse. Therefore, only the ellipse can be reliably detected.

Further, in the vehicle mounting controller 1, the gravity center position of a parallelogram inscribed in the object figure is calculated as the central position of the ellipse. When an ellipse parameter is calculated, a contour point constituting the parallelogram in which no gravity center position is conformed to the central position of the ellipse is set to be excluded.

Figure 15A:
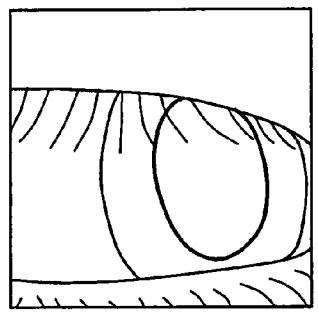
FIGS. 15A and 15B are schematic views showing an image of an eye.
Figure 15C:
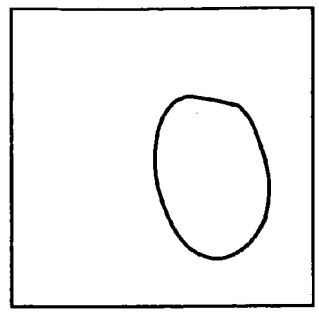
FIGS. 15C and 15D are schematic views showing an object figure having a defective contour corresponding to FIGS. 15A and 15B, and FIGS. 15E and 15F are schematic views showing a detected ellipsoid corresponding to FIGS. 15E and 15F.
Figure 15E:
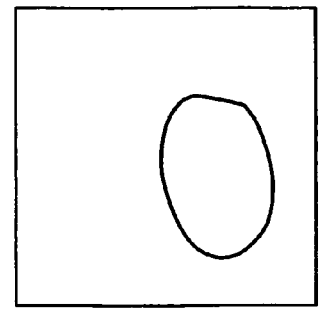
Figure 15B:
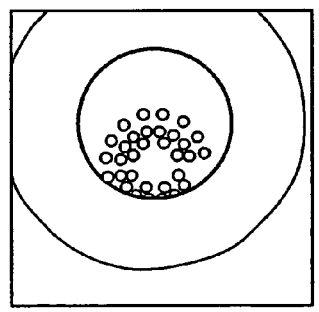
Figure 15D:
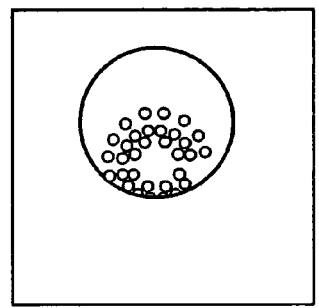
Figure 15F:
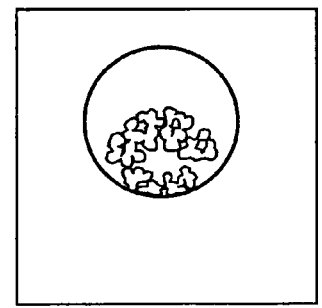

Accordingly, in accordance with the vehicle mounting controller 1, even when the object figure is an ellipse defective in one portion of the contour as shown in FIGS. 15A and 15B, the contour (outlier) constituting the defective portion is not used in the calculation of the ellipse parameter. Thus, the calculation of the ellipse parameter using the Gauss Newton method can be rapidly converged, and the ellipse as the contour of the object figure can be correctly restored.

As a result of an experiment made by using an image (640×480 pixels) shown in FIGS. 5A and 5B, about 0.007 second is required in the vehicle mounting controller 1 in the detection of the ellipse (eye pupil). In contrast to this, about 90 seconds are required in the generalized Hough transform as the background art. It is understood from this result that the ellipse can be detected at very high speed in accordance with the vehicle mounting controller 1.

Further, as a result of an experiment made by changing a defective ratio of the contour (ellipse) of the object figure, a preferable detection accuracy of the elliptical center is obtained in the vehicle mounting controller 1 if the defect of the contour is continuously 25% or less on the entire circumference. Further, even when there is a defect of 25% or more on the entire circumference, it has been confirmed that the elliptical center can be exactly detected if it is not a continuous defect.

The continuous defective ratio of the contour is here described with respect to an image after the edge processing as shown in FIGS. 15E and 15F. Further, the continuous defective ratio of the ellipse tends to be very raised in an image in which illumination is reflected in the eye pupil.

Further, as a method for calculating the gravity center of the parallelogram, the gravity center may be also calculated by calculating a straight line connecting the middle points of opposite sides of the parallelogram and calculating an intersection point of this straight line.

In this embodiment mode, the gravity centers of plural parallelograms are set by moving points XIVA and XIVB in the vertical direction (increasing and decreasing directions of the coordinate Y) of the ellipse, and changing the lengths of the first horizontal line and the second horizontal line (i.e., the size of the parallelogram). However, the gravity centers of the plural parallelograms may be also set by respectively moving points XIVA and XIVB in the left and right directions of the ellipse from both left and right ends of the ellipse. When points XIVA and XIVB are moved in the left and right directions of the ellipse, a first vertical line and a second vertical line extending in the vertical direction from points A and B may be also respectively used instead of the first horizontal line and the second horizontal line.

Figure 16:
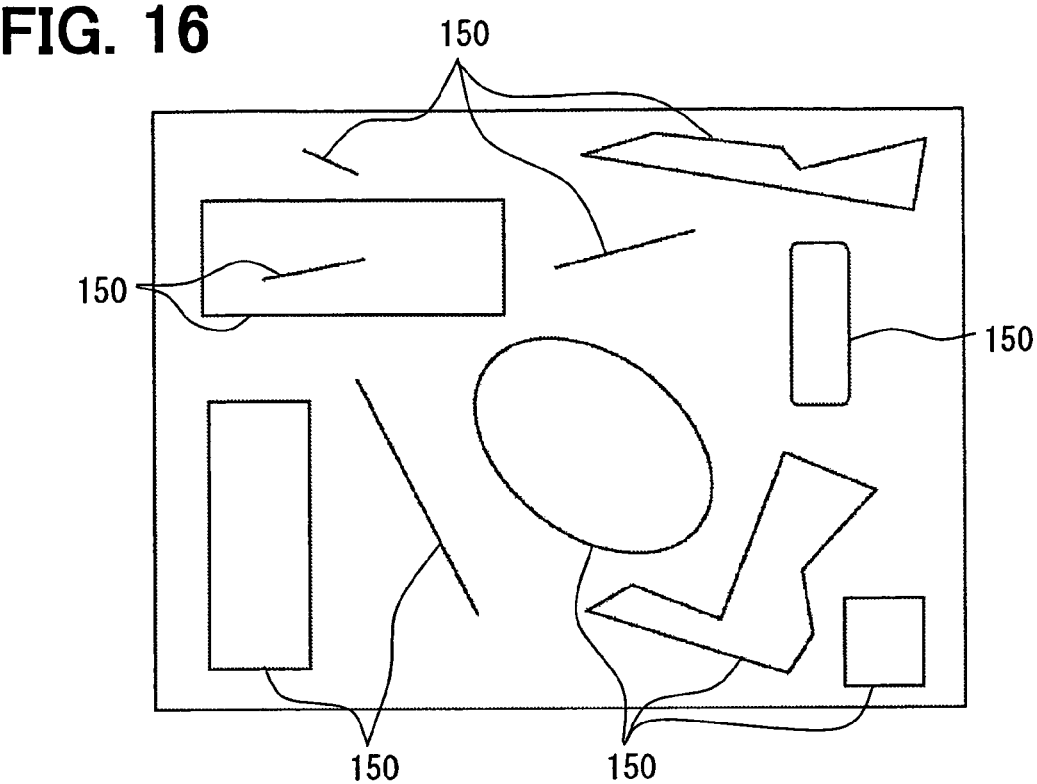
FIG. 16 is a schematic view showing various object figures.

Further, the iris or the eye pupil of a driver is detected, but no detected ellipse is limited to the iris or the eye pupil of the driver. Namely, only the ellipse may be also extracted from an image including ellipses and other figures (object figure 150) as shown in FIG. 16.

Figure 17:
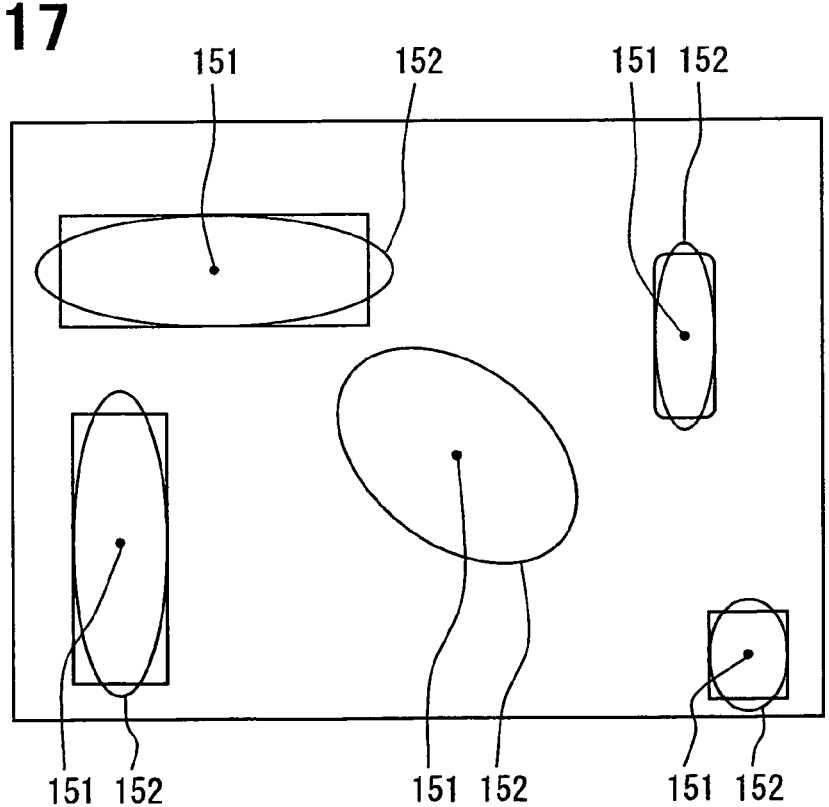
FIG. 17 is a schematic view showing candidature ellipsoid corresponding to FIG. 16.
Figure 18:
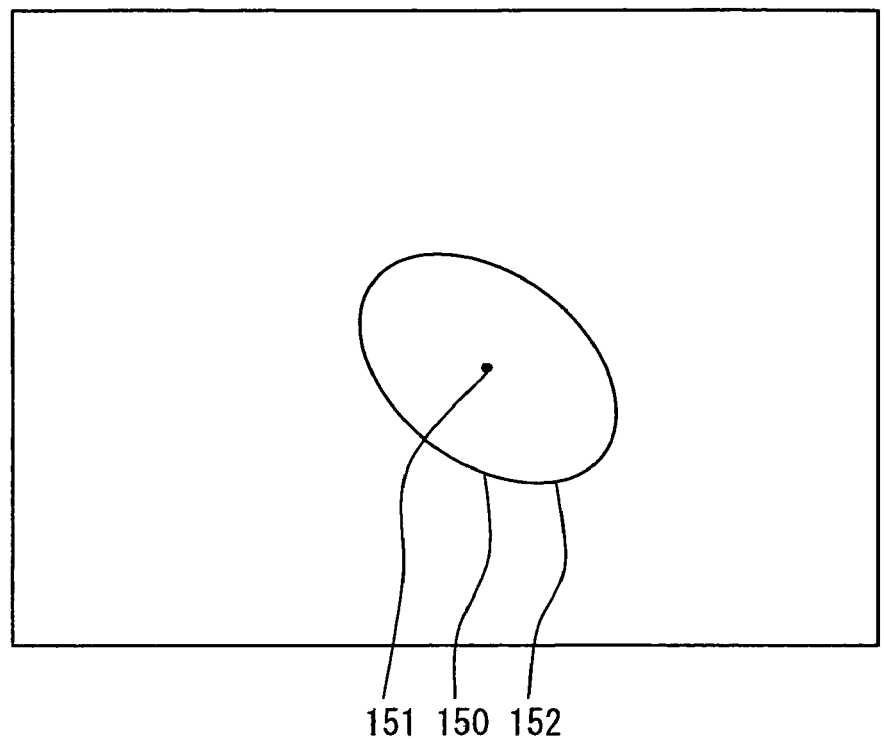
FIG. 18 is a schematic view showing detected ellipsoid corresponding to FIG. 16.
Figure 19A:
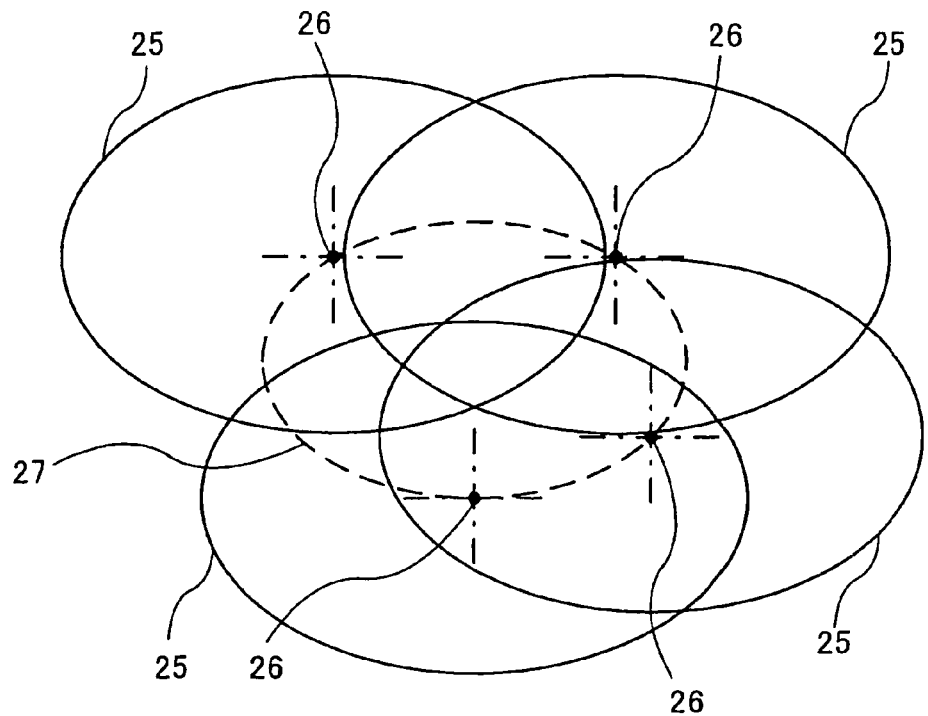
FIGS. 19A and 19B are graphs explaining the general Hough transform method according to the related art.
Figure 19B:
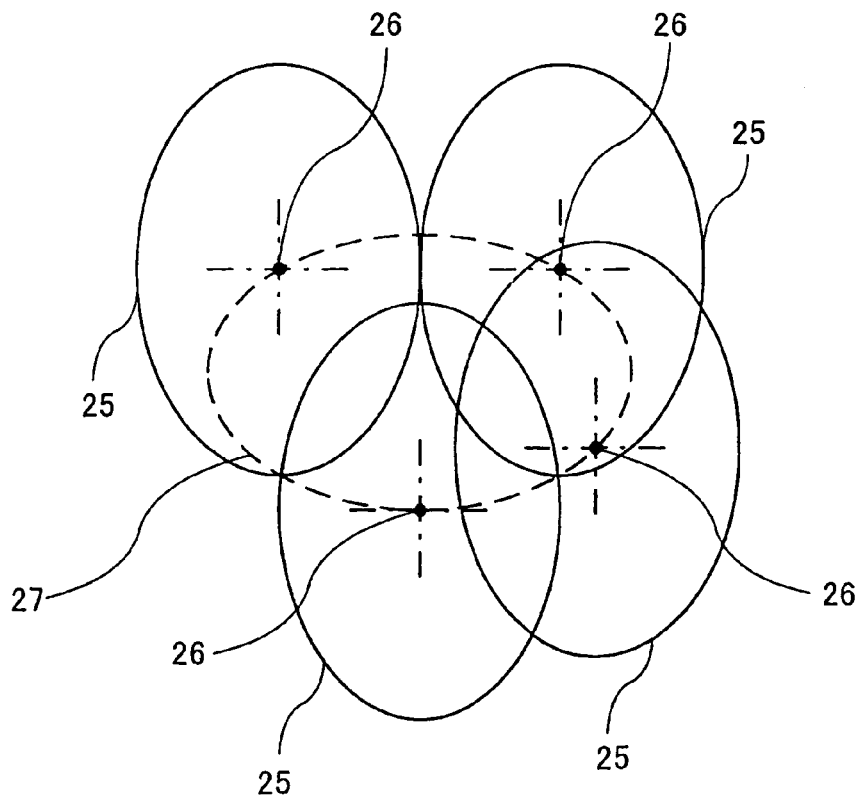

In this case, only figures shown in FIG. 17 are left since figures unable to detect the center 151 of the object figure are removed from data of the input image. Further, when the adaptability ratio of the contour of the object figure 150 and a restored ellipse 152 is a certain threshold value or less, this object figure is removed. Therefore, only the ellipse can be detected as shown in FIG. 18.

The present invention can be also applied to a machine tool, etc. for selecting and using a tool including the ellipse from plural tools of different shapes from such an application example.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A method for detecting an ellipsoid using a computer, the method comprising:
   extracting an ellipsoid candidate;
   extracting an ellipsoid contour;
   calculating an ellipsoid parameter;
   calculating an adaptability ratio; and
   eliminating the ellipsoid candidate, wherein
   the step of extracting the ellipsoid candidate includes steps of:
      inputting an image having various figures;
      selecting the ellipsoid candidate from the various figures in such a manner that the ellipsoid candidate satisfies a predetermined condition; and
      extracting a contour candidate point and a center point of the ellipsoid candidate,
   the step of extracting the ellipsoid contour includes steps of:
      drawing a plurality of straight lines passing through the center point of the ellipsoid candidate;
      determining a pair of contour candidate points, which is a pair of cross points between each straight line and a contour of the ellipsoid candidate;
      calculating a first distance between one of a pair of contour candidate points and the center point;
      calculating a second distance between the other one of a pair of contour candidate points and the center point; and
      defining a pair of the contour candidate points as a pair of ellipsoid contour points when a difference between the first and second distances is disposed in a predetermined range,
   the step of calculating the ellipsoid parameter is performed based on a pair of ellipsoid contour points and the center point,
   the step of calculating the adaptability ratio includes steps of:
      drawing a complete ellipsoid based on the ellipsoid parameter; and
      calculating the adaptability ratio between a contour of the complete ellipsoid and the contour of the ellipsoid candidate, and
   the step of eliminating the ellipsoid candidate is performed when the adaptability ratio is equal to or smaller than a predetermined threshold.

2. An image recognizing device for detecting an ellipsoid, the image recognizing device comprising:
   a first extracting element for extracting an ellipsoid candidate;
   a second extracting element for extracting an ellipsoid contour;
   a first calculating element for calculating an ellipsoid parameter;
   a second calculating element for calculating an adaptability ratio; and
   an eliminating element for eliminating the ellipsoid candidate, wherein
   the first extracting element is capable of:
      inputting an image having various figures;
      selecting the ellipsoid candidate from the various figures in such a manner that the ellipsoid candidate satisfies a predetermined condition; and
      extracting a contour candidate point and a center point of the ellipsoid candidate,
   the second extracting element is capable of:
      drawing a plurality of straight lines passing through the center point of the ellipsoid candidate;
      determining a pair of contour candidate points, which is a pair of cross points between each straight line and a contour of the ellipsoid candidate;
      calculating a first distance between one of a pair of contour candidate points and the center point;
      calculating a second distance between the other one of a pair of contour candidate points and the center point; and
      defining a pair of the contour candidate points as a pair of ellipsoid contour points when a difference between the first and second distances is disposed in a predetermined range,
   the first calculating element calculates the ellipsoid parameter based on a pair of ellipsoid contour points and the center point,
   the second calculating element is capable of:
      drawing a complete ellipsoid based on the ellipsoid parameter; and
      calculating the adaptability ratio between a contour of the complete ellipsoid and the contour of the ellipsoid candidate, and
   the eliminating element eliminates the ellipsoid candidate when the adaptability ratio is equal to or smaller than a predetermined threshold.

3. The image recognizing device according to claim 2, wherein
   the image includes a face of a human, and
   the ellipsoid candidate is an iris or a pupil of an eye of the human in the image.

4. A controller comprising:
   the image recognizing device defined in claim 3;
   a detecting element for detecting the iris or the pupil of the eye; and
   an executing element for executing a process of control, wherein
   the detecting element detects a movement of the ellipsoid detected by the image recognizing device as a movement of the iris or the pupil of the eye, and
   the executing element is capable of:
      estimating a behavior of the human based on the movement of the iris or the pupil of the eye; and
      executing the process of control, which is suitable for the behavior of the human.

5. The image recognizing device according to claim 2, wherein
   the image is detected by an infrared light.

6. A method for detecting a center of a figure using a computer, the method comprising:
   extracting a contour of the figure, which is disposed in an inputted image;
   determining a mass-center of a parallelogram; and
   determining the center of the figure, wherein
   the step of determining the mass-center of the parallelogram includes steps of:
      drawing a plurality of parallelograms, which are different together, wherein each parallelogram is inscribed in the contour of the figure; and
      determining a plurality of mass-centers of parallelograms, and
   the step of determining the center of the figure includes a step of defining the mass-center of the parallelogram as the center of the figure when the mass-center of the parallelogram has the highest occurrence rate among a plurality of mass-centers of parallelograms.

7. A method for detecting an ellipsoid using a computer, the method comprising:
   extracting a contour of the figure, which is disposed in an inputted image;
   determining a mass-center of a parallelogram;
   determining the center of the figure; and
   calculating an ellipsoid parameter, wherein
   the step of determining the mass-center of the parallelogram includes steps of:
      drawing a plurality of parallelograms, which are different together, wherein each parallelogram is inscribed in the contour of the figure; and
      determining a plurality of mass-centers of parallelograms,
   the step of determining the center of the figure includes a step of defining the mass-center of the parallelogram as the center of the figure when the mass-center of the parallelogram has the highest occurrence rate among a plurality of mass-centers of parallelograms, and
   the step of calculating the ellipsoid parameter includes steps of:
      approximating the contour of the figure with an ellipsoid, which is obtained from four corners of each parallelogram; and
      calculating the ellipsoid parameter of the ellipsoid.

8. The method according to claim 7, further comprising steps of:
   calculating an adaptability ratio; and
   eliminating the contour of the figure, wherein
   the step of calculating the adaptability ratio includes steps of:
      drawing a complete ellipsoid based on the ellipsoid parameter; and
      calculating the adaptability ratio between a contour of the complete ellipsoid and the contour of the figure, and
   the step of eliminating the contour of the figure is performed when the adaptability ratio is equal to or smaller than a predetermined threshold.

9. An image recognizing device comprising:
   an extracting element for extracting a contour of a figure, which is disposed in an inputted image;
   a first determining element for determining a mass-center of a parallelogram; and
   a second determining element for determining a center of the figure, wherein
   the first determining element is capable of:
      drawing a plurality of parallelograms, which are different together, wherein each parallelogram is inscribed in the contour of the figure; and
      determining a plurality of mass-centers of parallelograms, and
   the second determining element defines the mass-center of the parallelogram as the center of the figure when the mass-center of the parallelogram has the highest occurrence rate among a plurality of mass-centers of parallelograms.

10. The image recognizing device according to claim 9, further comprising:
   a calculating element for calculating an ellipsoid parameter, wherein
   the calculating element is capable of:
      approximating the contour of the figure with an ellipsoid, which is obtained from four corners of each parallelogram; and
      calculating the ellipsoid parameter of the ellipsoid.

11. The image recognizing device according to claim 10, further comprising:
   a second calculating element for calculating an adaptability ratio; and
   an eliminating element for eliminating the contour of the figure, wherein
   the second calculating element is capable of:
      drawing a complete ellipsoid based on the ellipsoid parameter; and
      calculating the adaptability ratio between a contour of the complete ellipsoid and the contour of the figure, and
   the eliminating element eliminates the contour of the figure when the adaptability ratio is equal to or smaller than a predetermined threshold.

12. The image recognizing device according to claim 10, wherein
   the inputted image includes a face of a human, and
   the figure is an iris or a pupil of an eye of the human in the image.

13. The image recognizing device according to claim 12, wherein
   the image is detected by an infrared light.

14. A controller comprising:
   the image recognizing device defined in claim 12;
   a detecting element for detecting the iris or the pupil of the eye; and
   an executing element for executing a process of control, wherein
   the detecting element detects a movement of the ellipsoid detected by the image recognizing device as a movement of the iris or the pupil of the eye, and
   the executing element is capable of:
      estimating a behavior of the human based on the movement of the iris or the pupil of the eye; and
      executing the process of control, which is suitable for the behavior of the human.

* * * * *